(12) United States Patent
Lyons et al.

(10) Patent No.: US 9,224,316 B2
(45) Date of Patent: Dec. 29, 2015

(54) WALL PLAQUE WITH DECORATIVE GRAPHIC AND METHODS OF MAKING THE SAME

(71) Applicants: Kurt William Lyons, Rochester, NY (US); Christopher Michael Phillips, Avon, NY (US)

(72) Inventors: Kurt William Lyons, Rochester, NY (US); Christopher Michael Phillips, Avon, NY (US)

(73) Assignee: Quorum Group, LLC, Medina, NY (US)

( * ) Notice: Subject to any disclaimer, the term of this patent is extended or adjusted under 35 U.S.C. 154(b) by 0 days.

(21) Appl. No.: 14/510,722

(22) Filed: Oct. 9, 2014

(65) Prior Publication Data

US 2015/0020422 A1 Jan. 22, 2015

Related U.S. Application Data

(63) Continuation of application No. 13/491,599, filed on Jun. 8, 2012, now Pat. No. 8,869,440.

(51) Int. Cl.
| | |
|---|---|
| G09F 7/02 | (2006.01) |
| G09F 7/14 | (2006.01) |
| G09F 7/00 | (2006.01) |
| G09F 7/10 | (2006.01) |
| B32B 38/00 | (2006.01) |
| B32B 37/24 | (2006.01) |
| G09F 7/08 | (2006.01) |
| B32B 37/12 | (2006.01) |
| B32B 38/06 | (2006.01) |

(52) U.S. Cl.
CPC . *G09F 7/14* (2013.01); *B32B 37/24* (2013.01); *B32B 38/145* (2013.01); *G09F 7/00* (2013.01); *G09F 7/08* (2013.01); *G09F 7/10* (2013.01); *B32B 37/12* (2013.01); *B32B 38/06* (2013.01); *B32B 2037/243* (2013.01); *B32B 2310/0831* (2013.01); *B32B 2590/00* (2013.01)

(58) Field of Classification Search
CPC ............... G09F 7/10; G09F 7/18; G09F 1/12; A47G 1/06; A47G 1/0616
USPC ............................... 40/771, 611, 649, 611.06
See application file for complete search history.

(56) References Cited

U.S. PATENT DOCUMENTS

| | | | |
|---|---|---|---|
| 2,193,928 A | 3/1940 | Johnson | |
| 2,419,187 A | 8/1944 | Jolly | |

(Continued)

OTHER PUBLICATIONS

Office Action, U.S. Appl. No. 29/423,299, Mailed May 17, 2013.

(Continued)

*Primary Examiner* — Shin Kim
(74) *Attorney, Agent, or Firm* — Workman Nydegger

(57) ABSTRACT

Implementations of the present invention provide systems, apparatus, and methods for precisely placing a graphic in a desired position between a face panel and a rear panel. In particular, implementations of the present invention comprise wall plaques having graphics that are printed directly to the back surface of face panels. Printing a graphic directly to the back surface of a face panel may help to ensure that the graphic is flat on the back surface of the face panel and is not misaligned. In addition, printing a graphic directly to the back surface of a face panel may help to eliminate the possibility that the graphic will be wrinkled, torn, or otherwise damaged prior to being laminated on the back surface of a face panel. Implementations of the present invention may also make the manufacturing process more efficient both in terms of cost and time.

22 Claims, 7 Drawing Sheets

(56) References Cited

U.S. PATENT DOCUMENTS

| | | | |
|---|---|---|---|
| 2,734,466 A | 2/1956 | Hammial |
| 2,890,910 A | 6/1956 | Bern |
| 2,784,847 A | 3/1957 | Holryd |
| 2,834,149 A | 5/1958 | Hunter |
| D215,054 S | 8/1969 | Swertz |
| 3,574,956 A | 4/1971 | Hamelin |
| 3,866,343 A | 2/1975 | Frost |
| 4,161,834 A | 7/1979 | Hendricks |
| 4,192,091 A | 3/1980 | Hawes |
| D266,338 S | 9/1982 | Mandel |
| D268,238 S | 3/1983 | Brescia |
| 4,518,140 A | 5/1985 | Ferranto |
| D279,201 S | 6/1985 | Shuman |
| D306,661 S | 3/1990 | Sanford |
| 4,914,844 A | 4/1990 | Seery |
| 4,971,646 A * | 11/1990 | Schell et al. ............. 156/244.17 |
| 5,010,672 A | 4/1991 | Coleman |
| 5,018,291 A | 5/1991 | Pasquale |
| 5,058,848 A | 10/1991 | Ferraro |
| 5,074,593 A | 12/1991 | Grosso |
| D328,470 S | 8/1992 | Costello |
| 5,189,822 A | 3/1993 | Schmanski |
| 5,407,711 A | 4/1995 | Lovison |
| 5,425,524 A | 6/1995 | Messina |
| D361,897 S | 9/1995 | Jackson |
| D365,535 S | 12/1995 | Muckler |
| 5,586,401 A | 12/1996 | Sheehan |
| 5,655,323 A | 8/1997 | Lassoff |
| 5,971,343 A | 10/1999 | Marlak |
| D418,309 S | 1/2000 | Kuebel |
| D418,984 S | 1/2000 | Koconis |
| D447,183 S | 8/2001 | Wilmotte |
| 6,374,523 B1 | 4/2002 | Smith |
| 6,470,612 B1 | 10/2002 | Pountney |
| 6,507,413 B1 | 1/2003 | Mueller |
| D471,236 S | 3/2003 | Robbins |
| 6,553,704 B1 | 4/2003 | Pigg |
| 6,574,896 B1 | 6/2003 | Howell |
| D476,818 S | 7/2003 | Stravitz |
| D487,289 S | 3/2004 | Richter |
| 6,780,486 B2 | 8/2004 | Kuo |
| 6,889,458 B2 | 5/2005 | Copley |
| 6,965,196 B2 | 11/2005 | Murasko |
| 6,971,197 B1 | 12/2005 | Seiber |
| D518,300 S | 4/2006 | Dele-Ogunrinde |
| D520,562 S | 5/2006 | Nash |
| 7,055,275 B1 | 6/2006 | Teza |
| D549,783 S | 8/2007 | Beno |
| D551,717 S | 9/2007 | Diller |
| D552,357 S | 10/2007 | Fu |
| 7,320,195 B1 | 1/2008 | Kushner |
| 7,438,194 B2 | 10/2008 | Wang |
| D581,987 S | 12/2008 | Maier-Hunke |
| 7,484,325 B2 | 2/2009 | Benedict |
| 7,762,704 B2 | 7/2010 | Brychell |
| 7,874,842 B2 | 1/2011 | Beno |
| D637,195 S | 5/2011 | Stammers |
| 7,954,267 B2 | 6/2011 | Anzalone |
| 8,020,329 B2 | 9/2011 | Chavez |
| 8,046,945 B2 | 11/2011 | Radcliffe |
| 8,127,478 B2 | 3/2012 | Blue |
| 8,141,280 B2 | 3/2012 | Doss |
| 8,484,872 B2 | 7/2013 | Blue |
| D687,493 S | 8/2013 | Rippinger |
| 8,608,486 B1 | 12/2013 | Brashear |
| 2003/0136072 A1 | 7/2003 | Peng |
| 2004/0229202 A1 | 11/2004 | Sohl |
| 2005/0105303 A1 | 5/2005 | Emde |
| 2006/0207134 A1 | 9/2006 | Harry |
| 2007/0099457 A1 | 5/2007 | Beno |
| 2007/0099510 A1 | 5/2007 | Beno |
| 2007/0141546 A1 | 6/2007 | Kang |
| 2009/0068632 A1 | 3/2009 | Thompson |
| 2009/0193699 A1 | 8/2009 | Benedict |
| 2010/0140428 A1 | 6/2010 | Vassallo |
| 2010/0199532 A1 | 8/2010 | Blue |
| 2010/0229442 A1 | 9/2010 | Snow |
| 2011/0151427 A1 | 6/2011 | Lin |
| 2012/0193247 A1 | 8/2012 | Fleet |
| 2013/0224723 A1 | 8/2013 | Gonzales |
| 2013/0323707 A1 | 12/2013 | Lyons |
| 2013/0326922 A1 | 12/2013 | Lyons |

OTHER PUBLICATIONS

Notice of Allowance, U.S. Appl. No. 29/423,599, Mailed Jun. 14, 2013.

Office Action, U.S. Appl. No. 13/491,599, Mailed Dec. 19, 2013.

Notice of Allowance, U.S. Appl. No. 13/491,599, Mailed Jul. 15, 2014.

Office Action, U.S. Appl. No. 29/465,126, Mailed Sep. 8th, 2014.

* cited by examiner

WALL PLAQUE WITH DECORATIVE GRAPHIC AND METHODS OF MAKING THE SAME

CROSS-REFERENCE TO RELATED APPLICATIONS

The present invention is a continuation of U.S. patent application Ser. No. 13/491,599 entitled "Wall Plaque With Decorative Graphic and Methods of Making the Same" filed Jun. 8, 2012, the entire content of the foregoing patent application is incorporated by reference herein.

BACKGROUND OF THE INVENTION

Background and Relevant Art

Individuals and/or businesses often use wall plaques as a way to provide notices and display a variety of different information. Conventional wall plaques may include a graphic that is positioned between a transparent or semi-transparent face panel and a rear panel. The graphic within a plaque may identify the location of different offices within a building or identify the individual or individuals that work within a specific office. Other plaques may be used to identify building entrances/exits, bathrooms, emergency exit maps, elevator/stairs locations, and the like.

Individuals and/or businesses may place these plaques in high visibility areas. For example, plaques may hang from overhead structures, such as ceilings, or secure to vertical surfaces, such as walls. These plaques may hang indoors or outdoors and may include a variety of different shapes and sizes.

The graphic of conventional wall plaques typically include a sheet of paper or film having desired information printed thereon. For example, a graphic used in a conventional wall plaque may include an office number, an individual's name, his or her title or position, and/or other information. During the manufacturing process, this sheet of paper or film is typically laminated between face panel and a rear panel so that the graphic is viewable, at least in part, through the face panel.

Creating a graphic by printing information onto a sheet of paper or film and laminating the graphic layer between sheets can lead to a variety of problems. For example, when a significant amount of ink is applied to paper or film, the paper or film may become warped or wavy. It may be difficult or impossible to laminate warped or wavy paper to a face panel. In addition, some graphics may be larger or smaller than a standard sized sheet of paper. To the extent that a graphic is smaller than a standard sized sheet of paper, an individual may need to trim the paper to a desired size. Trimming a graphic may lead to errors and is time consuming. To the extent that a graphic is larger than a standard sized sheet of paper, a printer that accommodates larger paper may be required or a graphic may need to be printed on more than a single sheet of paper. Either way, this can also lead to an increased potential for error and manufacturing cost.

Even if these problems are avoided, others problems may arise during the lamination process. For example, when laminating a graphic layer between face and back panels, the graphic may easily move and become misaligned or crooked. Alternatively, the lamination process may cause a graphic to wrinkle, rip, or otherwise damage the graphic during the lamination process. Each of these scenarios, and others, may lead to the creation of a plaque having a graphic that is in part or in whole unreadable or otherwise undesirable.

Accordingly, there are a number of problems that exist with conventional plaques and the manufacturing processes used to create wall plaques.

BRIEF SUMMARY

One or more implementations of the present invention solve one or more of the foregoing or other problems in the art with provide systems, apparatus, and methods for precisely placing a graphic in a desired position between a face panel and a rear panel. In particular, implementations of the present invention comprise wall plaques having graphics that are printed directly to the back surface of face panels. As such, implementations of the present invention can help ensure that the graphic is flat on the back surface of the face panel and is not misaligned. In addition, one or more implementations can help to eliminate the possibility that the graphic will wrinkle, tear, or otherwise sustain damage prior to, or during manufacturing. Implementations of the present invention can also make the manufacturing process more efficient both in terms of cost and time.

For example, one implementation of a wall plaque includes a transparent or semi-transparent face panel having a front surface and a back surface. The wall plaque further includes a graphic printed on the back surface of the face panel and at least one layer of sealing compound covering the graphic. The wall plaque also includes a back panel having a front surface and a back surface. An attachment mechanism secures the face panel to the back panel such that the graphic and sealing compound are positioned between the face panel and the back panel.

Another implementation of a wall plaque includes a transparent or semi-transparent face panel having a front surface and a back surface. Additionally, the wall plaque includes a back panel having a front surface and a back surface. The front surface of the back panel is laminated to the back surface of the face panel. The wall plaque further includes a graphic printed on a portion of the back surface of the face panel, and a window portion on the back surface of the face panel that is substantially free of any graphic. Also, the wall plaque includes at least one recessed section extending into the front surface of the back panel. The at least one recessed section defines a gap between the face panel and the back panel. Furthermore, the at least one recessed section is aligned with the window portion of the face panel.

In addition to the foregoing, an implementation of a method for manufacturing a wall plaque involves printing a graphic directly on at least a portion of a back surface of a transparent or translucent face panel. The method also involves applying one or more layers of a sealing compound to the back surface of the face panel such that the sealing compound covers the graphic. The method further involves securing the back surface of the face panel to a front surface of a back panel such that the graphic and sealing compound are positioned between the face panel and the back panel and the graphic is visible through the face panel.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific implementations thereof which are illustrated in the appended drawings. Understanding that these drawings depict only typical implementations of the invention and are not therefore to be considered to be limiting of its scope, the invention will be described and explained with additional specificity and detail through the use of the accompanying drawings in which.

DETAILED DESCRIPTION

Implementations of the present invention provide systems, apparatus, and methods for precisely placing a graphic in a desired position between a face panel and a rear panel. In particular, implementations of the present invention comprise wall plaques having graphics that are printed directly to the back surface of face panels. As such, implementations of the present invention can help ensure that the graphic is flat on the back surface of the face panel and is not misaligned. In addition, one or more implementations can help to eliminate the possibility that the graphic will wrinkle, tear, or otherwise sustain damage prior to, or during manufacturing. Implementation of the present invention can also make the manufacturing process more efficient both in terms of cost and time.

By printing a graphic directly to the back surface of a face panel, the time and expense associated with printing a graphic on a sheet of paper and laminating that paper to a face panel may be avoided. In addition, printing a graphic directly to the back surface of the face panel may be particularly useful should a plaque includes slots or gaps where one or more external components may be selectively inserted into and removed from between a face panel and a back panel. As described in more detail hereafter, in order for the external component to be seen behind the face panel in these implementations, a window of blank or unprinted space in the graphic may need to align precisely with the gap. Conventional processes for manufacturing plaques may be more prone to error in manufacturing these products because even more precision is needed to ensure that the window of blank space aligns with the gap. Even a slight misalignment between the graphic and the face panel and/or rear panel can render the plaque unreadable or otherwise unusable.

Figure 1:
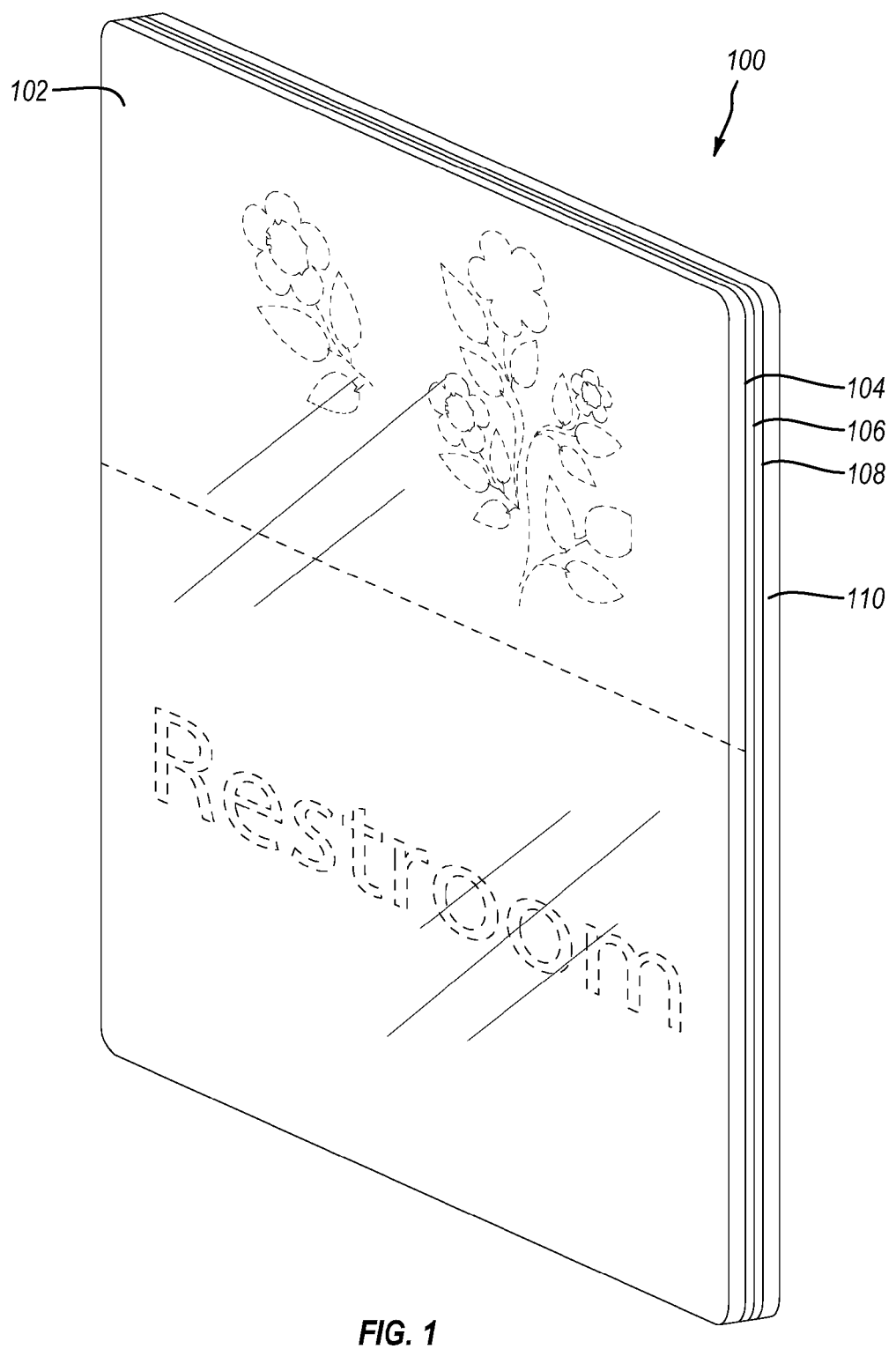
FIG. 1 illustrates a perspective view of a wall plaque according to one or more implementations of the present invention.
Figure 2:
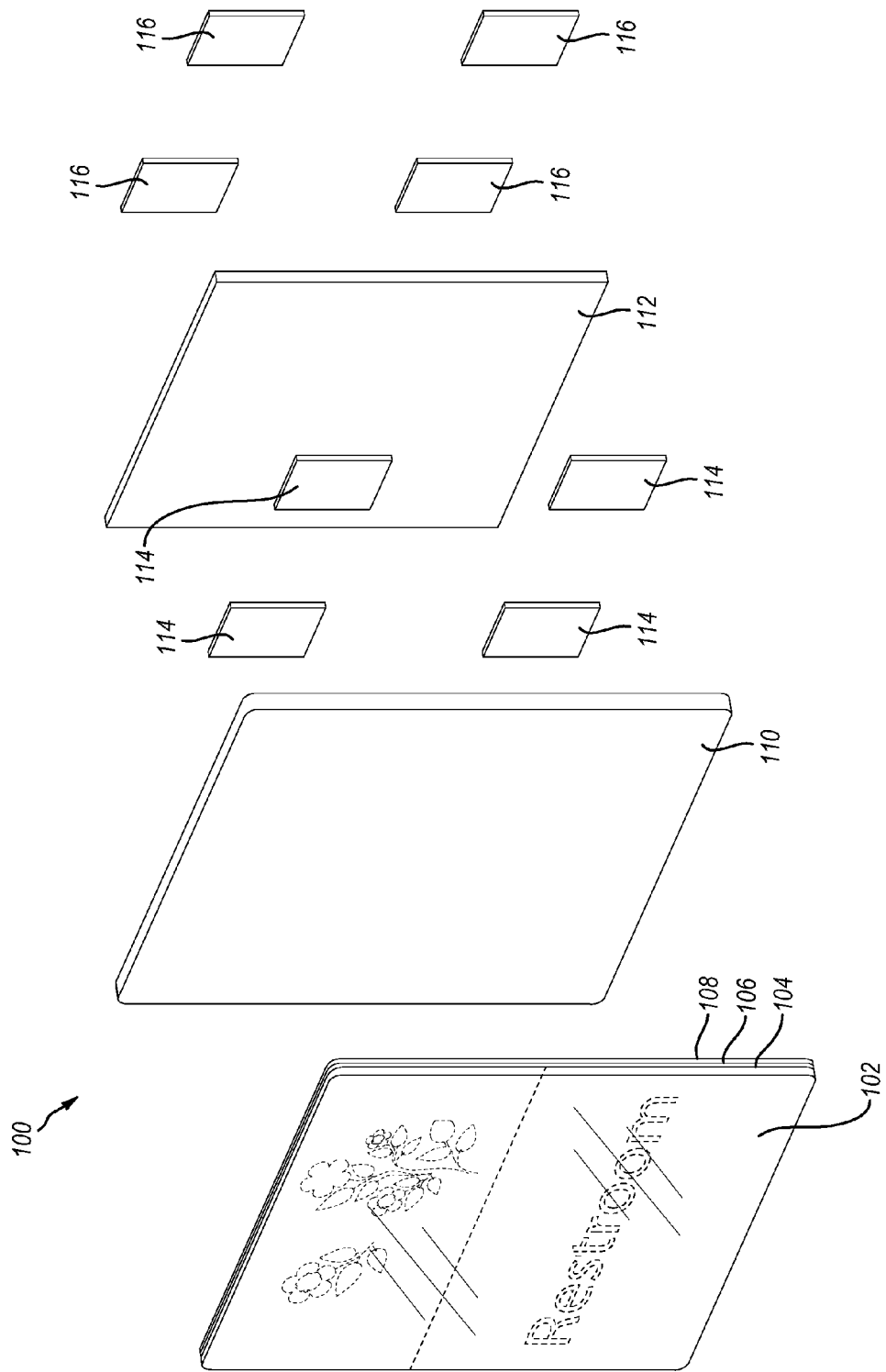
FIG. 2 illustrates an exploded view of the wall plaque illustrated in FIG. 1.

FIGS. 1 and 2 illustrate a wall plaque 100. Specifically, FIG. 1 illustrates a perspective view of wall plaque 100, while FIG. 2 illustrates an exploded view of wall plaque 100. As can be seen from these figures, information board 100 can include a number of components. Specifically, wall plaque 100 includes a face panel 102, a graphic 104, and a back panel 110.

As used herein, the terms "front" and "back" are used in reference to a support wall or a portion of the wall plaque 100 that may attach to a support wall. In particular, "back" refers to a component or feature nearer to the support wall to which the wall plaque 100 may attach. While "front" refers to a component or feature farther from the support wall.

In one or more implementations, the face panel 102 is translucent, transparent, or semi-transparent in whole or in part. Thus, in at least one implementation, the face panel 102 is clear and transparent. In alternative implementations, the face panel 102 is colored and translucent. As explained in greater detail below, the transparency of the face panel 102 can allow one to at least partially see a graphic 104 behind the face panel 102.

The face panel 102 can comprise a sheet or panel including one or more layers of material. Specifically, such materials can include, but are not limited to, ceramic, glass, plastic, and acrylic materials. For example, the face panel 102 can include polyethylene terephthalate (PET), polyethylene terephthalate with glycol-modification (PETG), acrylonitrile butadiene-styrene (ABS), polyvinyl chloride (PVC), polyvinyl butyral (PVB), ethylene vinyl acetate (EVA), polycarbonate (PC), styrene, polymethyl methacrylate (PMMA), polyolefins (low and high density polyethylene, polypropylene), thermoplastic polyurethane (TPU), cellulose-based polymers (cellulose acetate, cellulose butyrate or cellulose propionate), poly lactic acid (PLA), or the like. Furthermore, the face panel 102 can include other glass or thermoplastic polymers or thermoplastic polymer blends, or combinations and mixtures thereof. In addition, dry erase writing surface 102 can include any number other layers or coatings.

As shown by FIGS. 1 and 2, the wall plaque 100 can include a graphic 104 is printed directly on the back surface of face panel 102. One will appreciate in light of the disclosure herein that because the graphic 104 is printed on the face panel, the graphic can be devoid of wrinkles or other problems commonly associate with conventional paper or film graphic interlayers. Graphic 104 may be printed on the back surface of face panel 102 using a number of different printers. For example, in one or more implementations graphic 104 may be printed on the back surface of face panel 102 using a flatbed ultraviolet printer. The ink used to print graphic 104 onto the back surface of face panel 102 may be colored and/or black and white. An adhesion promoter may be applied to the back surface of face panel 102 prior to the printing of graphic 104 in order to ensure that the ink in graphic 104 bonds to the back surface of face panel 102. An adhesion promoter may comprise, for example, MIMAKI UV PrimerGM-1 or SERI-COL UVIJET ZE680, ZE720 or ZE1000.

Figure 3:
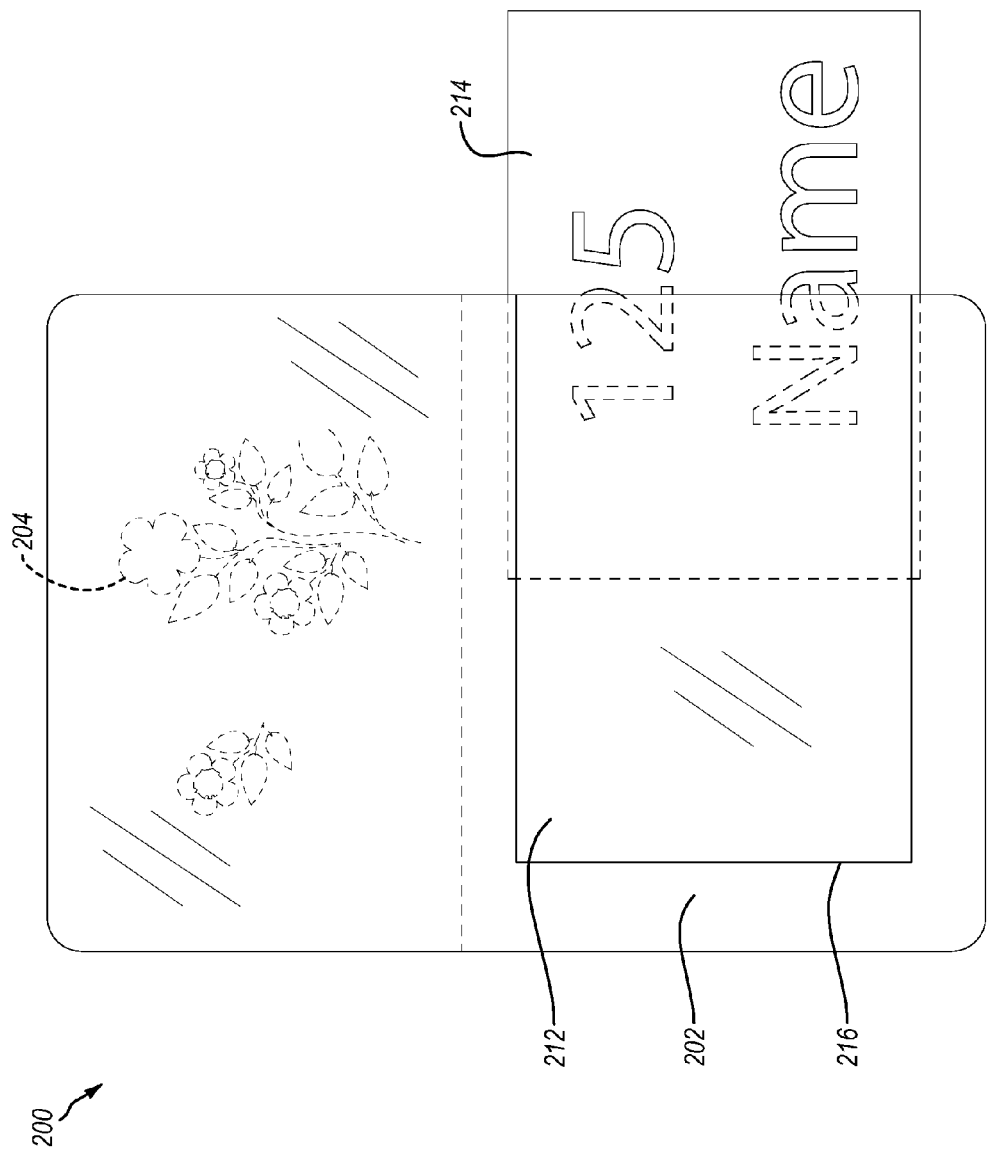
FIG. 3 illustrates a front view of another wall plaque according to one or more implementation of the present invention.

A graphic, according to one or more implementations of the present invention, may include one or more decorative images, symbols, or other information to be displayed in a wall plaque. For example, FIGS. 1 and 3 illustrate that the graphic 104 can identify the location of one or more restrooms. Specifically, graphic 104 includes a decorative image of a flower and the word "restroom." Other implementations can include graphics that identify building entrances/exits, office/business names, building maps, elevator/stairs locations, and the like.

Additionally, the graphic 104 can cover all or part of the back surface of a face panel 102. As explained in greater detail below, in one or more implementations the graphic covers only a portion of the back surface of the face panel 102. In alternative implementations, the graphic 104 can cover the entire back surface of the face panel 102. In addition to the forgoing, the graphic 104 can comprise an opaque image, a translucent image, or an at least partially transparent image.

In at least one implementation, the graphic 104 can comprise UV inks. In one or more implementations, UV inks can allow for improved bonding to an acrylic or resin face panel 102. In particular, as UV inks dry (i.e., turn from a liquid or paste to a solid) through a photomechanical process upon exposure to ultra-violent lights, they do not require solvents and can bond to resin and other non-porous substrates.

In addition to the graphic, the wall plaque 100 can further include one or more layers of a sealing compound. For example, FIGS. 1 and 2 illustrate that the wall plaque 100 can include a first 106 and a second 108 layers of sealing compound. In alternative implementations, a wall plaque may include only a single layer of a sealing compound. Alternatively still, more than two layers of a sealing compound may be applied to the back surface of a graphic.

As shown by FIGS. 1 and 2, the layer(s) of sealing compound 106, 108 can cover or conceal the back of the graphic. In other words, the layer(s) of sealing compound 106, 108 can separate the graphic 104 from the back panel 110. Furthermore, the layer(s) of sealing compound 106, 108 can entirely cover the graphic 104 as shown by FIGS. 1 and 2. Alternatively, the layer(s) of sealing compound 106, 108 can cover only a portion of the graphic 104.

The one or more sealing layers 106, 108 can prevent the ink in the graphic from bleeding or otherwise blurring. In one or more implementations, the sealing compound comprises an opaque white ink, such as a UV ink. In still further implementations, the sealing compound comprises a coating, such as a UV coating.

As previously mentioned, wall plaque 100 also includes a back panel 110. As shown by FIGS. 1 and 2, the back panel 110 can attach to the face panel 102 and sandwich the graphic 104 and any sealing compound layers 106, 108 therebetween. In particular, the back panel 110 can attach indirectly to the face panel via the graphic 104 and sealing layers 106 and 108. Face panel 102 and back panel 110 may be substantially the same size and shape or they may have different sizes and shapes. For example, a back panel 110 may have a size slightly larger or smaller in length and height than face panel 102. A shown by FIGS. 1 and 2, in at least one implementation, face panel 102 and back panel 110 are substantially the same size and shape.

Back panel 110 can comprise any number of different natural and/or synthetic materials including but not limited to plastic, wood, metal, particle board, glass, ceramic, acrylic, resin etc. In at least one implementation, back panel 110 comprises an opaque white acrylic. As alluded to earlier, an attachment mechanism can secure back panel 110 to face panel 102. For example, a mechanical attachment mechanism, such as a nail, screw, clamp, and the like, can secure back panel 110 to face panel 102. Alternatively, a chemical attachment mechanism, such as a pressure activated adhesive or another adhesive or glue, can secure back panel 110 to face panel 102. Furthermore, in implementations in which portions of back panel 110 directly contact face panel 102 (such as a boarder surround the graphic 104) heat and/or pressure can fuse face panel 102 and back panel 110 together.

In at least one implementation, the attachment mechanism comprises a pressure activated adhesive, which is applied between back panel 110 and face panel 102. An assembler can apply the pressure activated adhesive over the sealing compound 106, 108 and graphic 104 or to the front surface of back panel 110. The pressure activated adhesive can comprise a liquid or film layer. Application of an adequate pressure to wall plaque 100 can activate the adhesive and secure the face panel 102 to the back panel 110.

In yet further implementations, the attachment mechanism comprises another appropriate adhesive layer such as a solid film-format ethylene vinyl acetate or "EVA"; ethylene acrylates, such as ethyl methacrylate or "EMA"; polyvinyl butyral or "PVB"; or any thermoplastic polyurethane (TPU) of aliphatic or aromatic construct capable of adhering opposing sheets together with applied heat. Still further adhesive layers can comprise thermoplastic polyolifins (TPO). Nevertheless, one will appreciate that liquid adhesives may also be appropriate for adhesive layer in some cases.

As can be seen in FIG. 2, wall plaque 100 can optionally include a spacing member 112. Spacing member 112 can serve to raise face panel 102 and back panel 110 away from a surface, such as a wall, to which wall plaque 100 is attached. Lifting face panel 102 and back panel 110 away from a vertical surface may facilitate painting or other maintenance that may be required on the vertical surface to which wall plaque 100 is attached. Spacing member 112 can attach to the back surface of back member 110. For example, FIG. 2 illustrates four double-sided adhesive members 114 secure the spacing member 112 to back member 112.

One will appreciate that an installer can secure wall plaque 100 to a support surface using any number of different attachment devices. For example, FIG. 2 illustrates that four double-sided adhesive members 116 can secure wall plaque 100 to a flat surface. Alternatively, one or more hooks, an adhesive, a mounting bracket, straps, cords, etc. can attach wall plaque 100 to a ceiling, wall, door, divider, or other support surface.

FIGS. 1 and 2 illustrate that the wall plaque 100 is rectangular in shape. In alternative implementations of the present invention, however, wall plaque may comprise any size and/or shape. For example, a wall plaque may have a square shape, triangular shape, circular shape, etc. In addition, the front surface of a face panel 102 may include one or more textured portions, such as raised or etched lettering and other symbols such as Braille.

Figure 4:
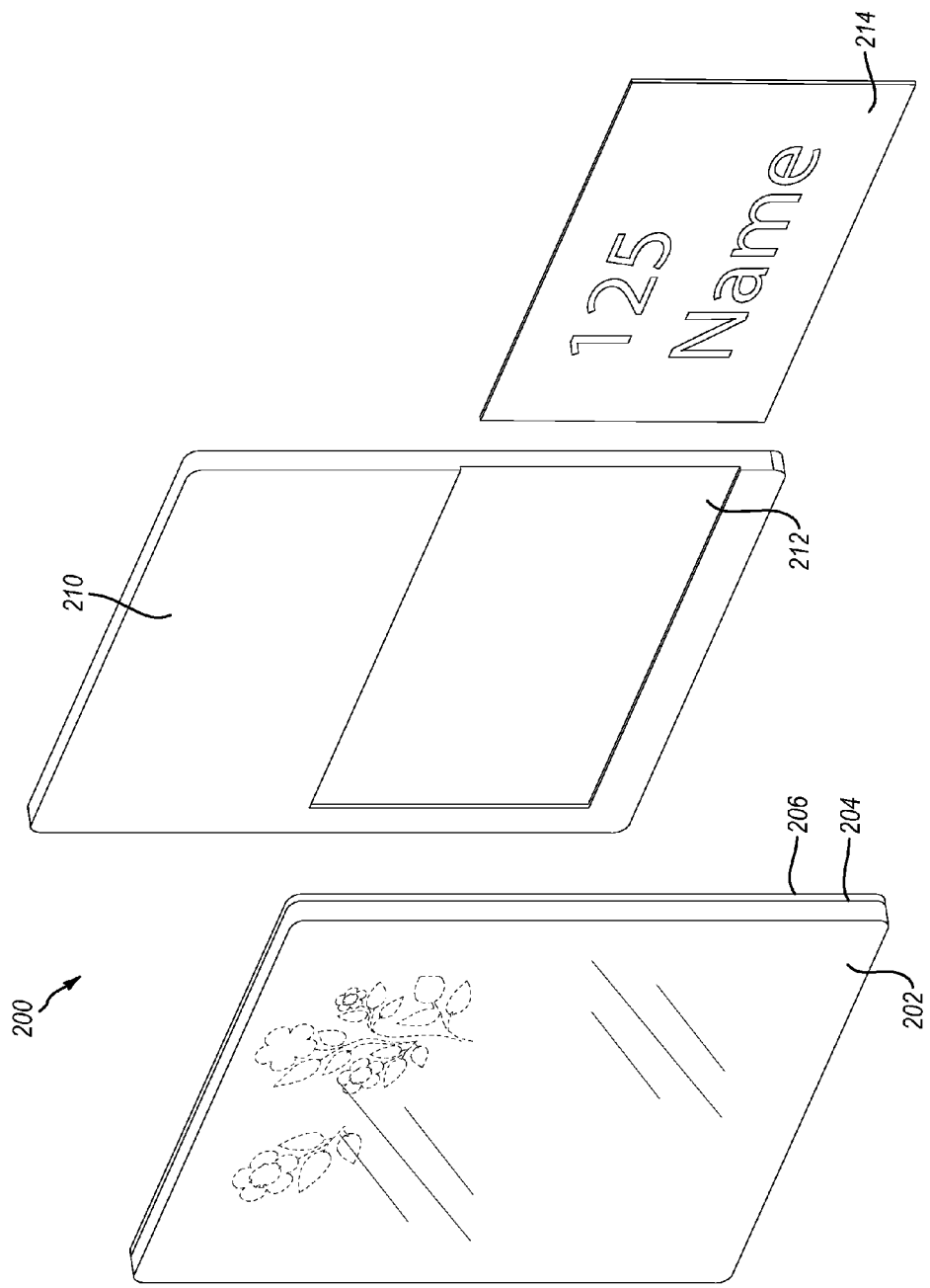
FIG. 4 illustrates an exploded view of the wall plaque illustrated in FIG. 3.

One or more implementations of the present invention include wall plaques including slots for inserts. For example, FIGS. 3 and 4 illustrate another implementation of a wall plaque 200 that includes a slot for an insert. Specifically, FIG. 3 illustrates a front view of wall plaque 200 and FIG. 4 illustrates an exploded view of wall plaque 200. Similar to wall plaque 100, wall plaque 200 includes a transparent or semi-transparent face panel 202, a graphic 204 printed on the back surface of face panel 202, and a back panel 210.

Unlike wall plaque 100, wall plaque 200 includes only a single layer 206 of a sealing compound. In addition, the front surface of back panel 210 includes a recessed section 212. As shown by FIG. 4, the recessed section 212 can extend into the front surface of the back panel 210 toward the back surface of the back panel 210. Furthermore, the recessed section can extend to at least one side edge of back panel 210 to provide access to the recessed section 212. Recessed section 212 may be created by a milling machine, drill press, or another machine or tool.

As with wall plaque 100, one may use any type of attachment mechanism to secure back panel 210 to face panel 202. For example, a person may apply an adhesive to the front surface of back panel 210 in order to secure back panel 210 to face panel 202. This adhesive, may be applied to the front surface of back panel 210 prior to the creation of recessed section 212. Thus, during the creation of recessed section 212, whether performed by a milling machine or another machine or tool, the adhesive that is applied to the portion of the back panel 210 removed to create the recessed section 212 will also be removed. Thus, when face panel 202 is secured to back panel 210 recessed section 212 creates a gap or slot between back panel 210 and face panel 202.

Recessed section 212 can have a size and shape to accommodate an insert 214. An individual may selectively insert and remove insert 214, or another appropriately shaped and sized insert, from the gap or slot created between face panel 202 and a back panel 210 by recessed section 212. Insert 214 maybe selectively inserted into and/or removed from this gap or slot through the side of back panel 210 to which recessed section 212 extends. In one implementation, an insert may be slightly smaller than recessed section 212 such that it may be easily inserted into and removed from a recessed section.

Insert 214 can comprise paper, plastic, metal, or another thin material. Furthermore, the insert can include information, such as a person's name, an office number, a map, or other information. One will appreciate that the recessed section can allow a user to selectively remove the insert 214 from wall plaque 200 and replace it with another appropriately sized insert having different information printed thereon. Thus, a person can change all or part of the information that appears on a plaque without having to replace the entire plaque.

Recessed section 212, according to one or more implementations of the present invention may have a variety of different sizes and shapes, depending on the inserts that the recessed section is to accommodate. For example, a recessed section 212 may be in the shape of a square, rectangle, triangle, or another shape. The depth of a recessed section 212 may also vary depending on the size and shape of the insert that the recessed section will be required to accommodate. For instance, the depth of recessed section 212 may be small. Alternatively, and depending on the thickness of back panel 210, recessed section 212 may have a much larger depth. In one implementation, recessed section 212 may extend to a depth of four hundredths of an inch. In one or more implementations, recessed section 212 may extend through back panel 210.

In order for insert 214 to be seen through face panel 202, a window portion 216 of space may exist in face panel 202 that is entirely or substantially free from any ink from graphic 204 and/or sealing compound 206. When face panel 202 is secured to back panel 210, window portion 216 may align with recessed section 212. In one or more implementations, a window of unprinted and unsealed area may correspond substantially in size and shape to a recessed section. Alternatively, and as is the case with wall plaque 200 shown in FIGS. 3 and 4, window portion 216 is slightly smaller than recessed section 212. Thus, graphic 204 extends over the top, bottom, and left side of recessed section 212 by a small amount. Thus, window portion 216 hides from view the top, bottom, and left edges of insert 214, thereby creating a cleaner look.

In alternative implementations, the back surface of face panel 202 may include a recessed section. The manufacturing process for such an implementation may include printing a graphic and applying one or more sealing layers to the back surface of the face panel 202. An adhesive, for example a heat or pressure activated adhesive may then be applied to the back surface of the face panel. A tool, such as a milling machine, may then create the recessed portion by removing the adhesive, sealing layer(s), graphic, and a desired amount of the face panel from the back surface of the face panel. The face panel may then be secured to a back panel.

The front surface of the back panel in this implementation may be flat, or it may also include a recessed section that may or may not align with the recessed portion on the back surface of the face panel. For example, in one implementation of the present invention a wall plaque may include two gaps or slots, one created by a recessed section in the back surface of the face panel and the other created by a recessed section in the front surface the back panel.

Figure 5:
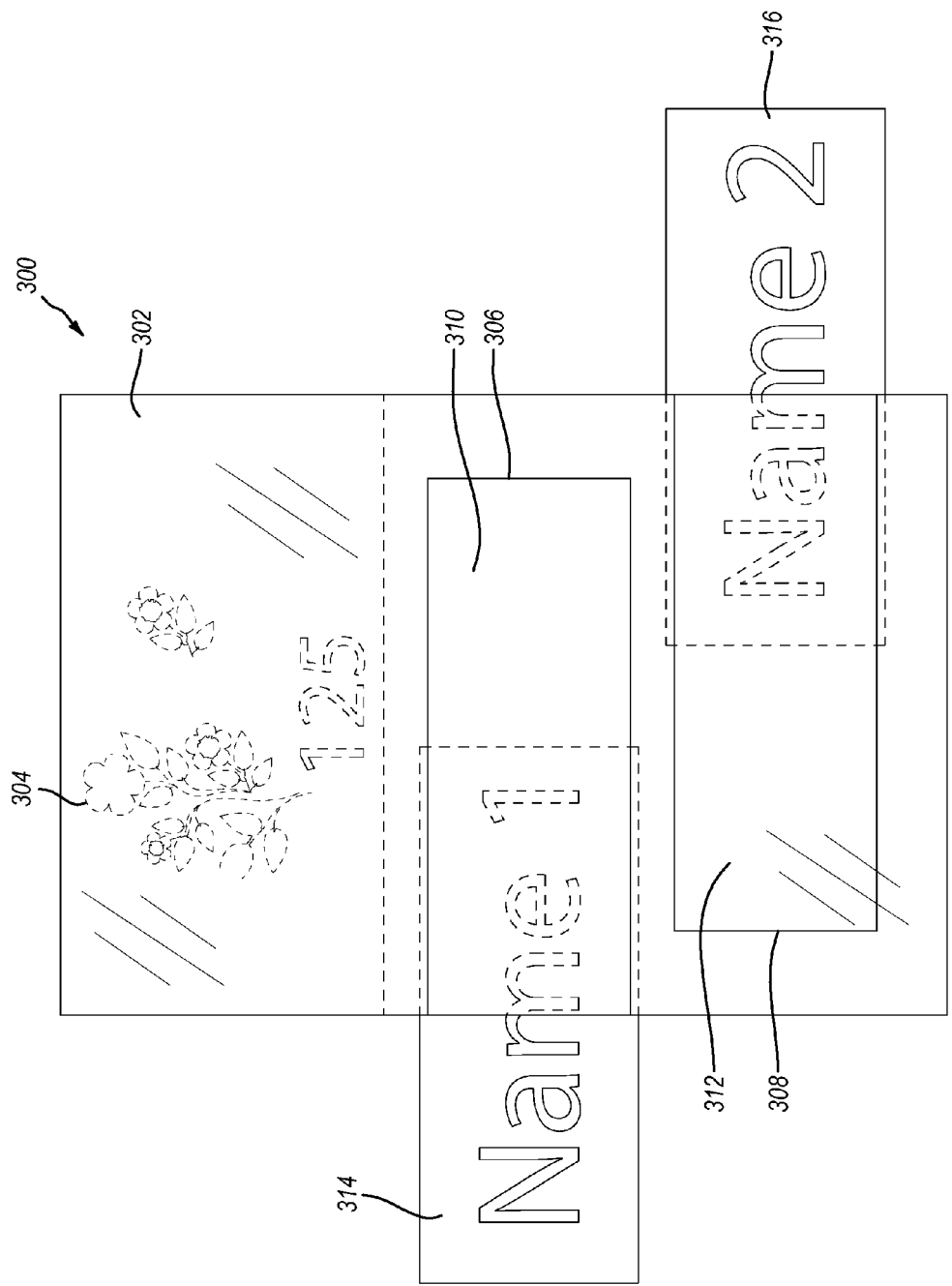
FIG. 5 illustrates a front view of another wall plaque according to one or more implementations of the present invention.

Wall plaques, according to one or more implementations of the present invention, can have any number of different styles, shapes, and/or configurations. For example, FIG. 5 shows wall plaque 300. Wall plaque 300 includes a face panel 302. A graphic 304 is printed on the back surface of face panel 302. Graphic 304, includes flowers, an office number, and two window portions 306 and 308. The back panel of wall plaque 300 includes two recessed sections 310 and 312 where a user can selectively place inserts 314 and 316.

Recessed section 306 extends to the left side of wall plaque 300 while recessed section 308 extends to the right side wall plaque 300. In one implementation, inserts 310 and 312 may include the names of individuals that work in the office identified by graphic 304. In addition, window portions 306 and 308 are slightly smaller than recessed sections 310 and 312. Thus, when inserts 314 of 316 are in recessed sections 310 and 312, three of the edges of inserts 314 and 316 may not be seen through face panel 302.

As illustrated in FIG. 5, insert 314 is within recessed section 310 through a left side of wall plaque 300. Insert 316 is shown partially within recessed section 312 through a right side of wall plaque 300. Because inserts 314, 316 have similar sizes, a user can insert the insert 314, or another insert having an appropriate size and shape, into recessed section 312. Similarly, a user can insert the insert 316, or another insert having an appropriate size and shape, into recessed section 310. In alternative implementations, each recessed section can have a different size and/or shape.

Figure 6:
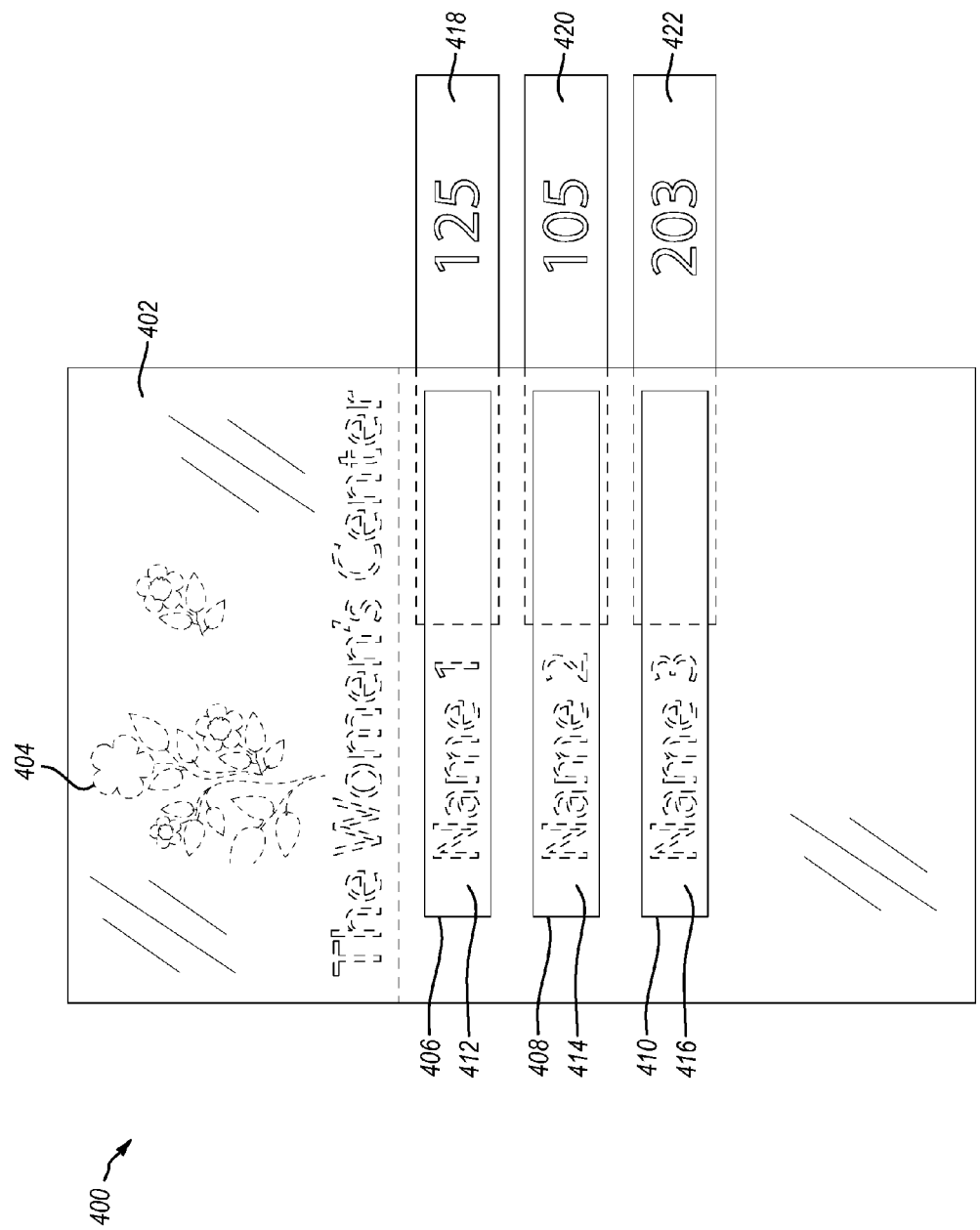
FIG. 6 illustrates a front view of yet another wall plaque according to one or more implementations of the present invention.

FIG. 6 illustrates yet another wall plaque 400 according to the present invention. Wall plaque 400 includes a face panel 402 and a graphic 404 that is printed to the back surface of face panel 402. Graphic 404 includes three separate window portions of unprinted space, 406, 408, and 410. The front surface of back panel in wall plaque 400 includes three recessed portions 412, 414, and 416, where a user can selectively insert or remove inserts 418, 420, and 422. Recessed sections 412, 414, and 416 each extend to a right side of wall plaque 400.

Window portions 406, 408, and 410 align substantially with recessed portions 412, 414, and 416. Window portions 406, 408, and 410 are slightly smaller than recessed portions 412, 414, and 416. In addition, windows 406, 408, and 410 do not extend to the right side of wall plaque 400. Rather, a portion of graphic 404 may cover recessed portions 412, 414, and 416 along the right side of wall plaque 400. Thus, when inserts 418, 420, and 422 are positioned within recessed portions 412, 414, and 416, the graphic 404 and/or sealing compound can cover all four edges of inserts 418, 420, and 422 to provide a clean and seamless look.

Figure 7:
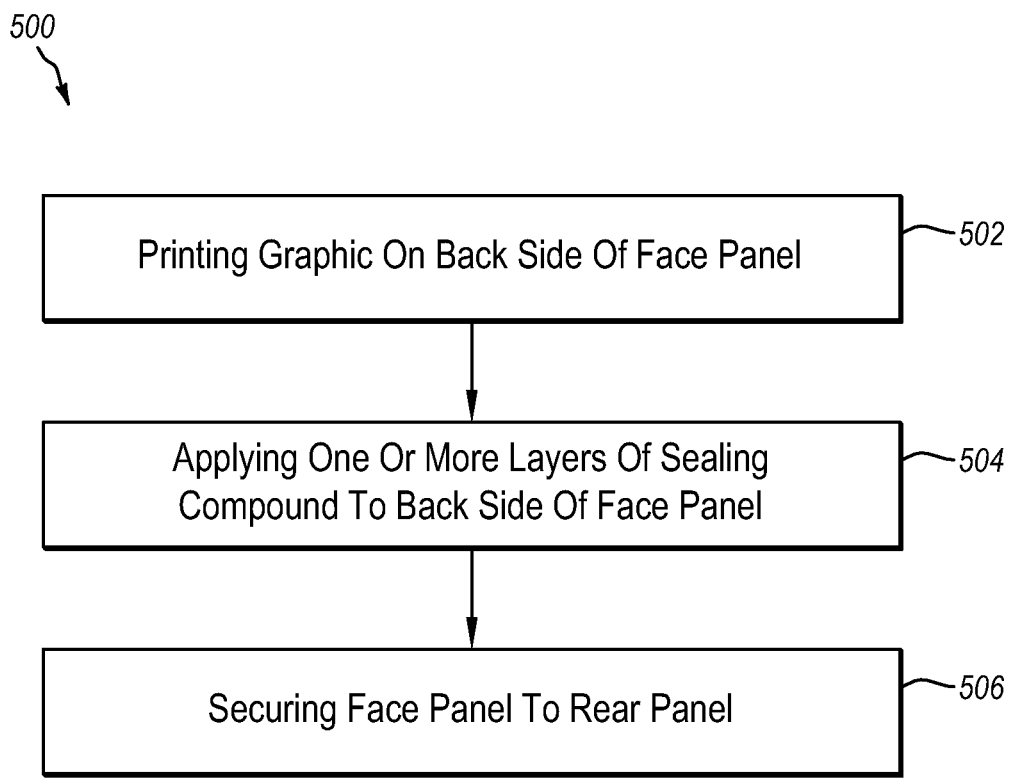
FIG. 7 illustrates steps that may be performed in a method for manufacturing a wall plaque according to one or more implementations of the present invention.

Accordingly, FIGS. 1-6, the corresponding text, and the examples, provide a number of different components and mechanisms for creating decorative and/or functional wall plaques or signs. In addition to the foregoing, implementations of the present invention can also be described in terms of flowcharts comprising acts and steps in a method for accomplishing a particular result. For example, FIG. 7 illustrates a flowchart of one exemplary method for manufacturing a wall plaque or sign. The acts of FIG. 7 are described below with reference to the components and diagrams of FIGS. 1 through 6.

For example, FIG. 7 shows that the method 500 of manufacturing a wall plaque or sign can comprise an act 502 of printing a graphic on a back surface of a back panel. Act 502 can include printing a graphic 104, 204, 304, 404 directly on at least a portion of a back surface of a transparent or translucent face panel 102, 202, 302, 402. For example, act 502 can comprise printing a UV curable ink onto an acrylic or resin face panel using a UV flatbed printer.

In at least one implementation, act 502 can further comprise applying an adhesion promoter to the back surface of a face panel prior to the printing of a graphic thereon. An adhesion promoter may ensure that the graphic bonds adequately with the face panel. Additionally, act 502 can involve leaving a portion of the back surface devoid of graphic 104, 204, 304, 404 to define a window portion 216, 306, 308, 406, 408, 410.

FIG. 7 shows that method 500 can further comprise an act 504 of applying one or more layers of a sealing compound to the back surface of the face panel. Act 504 can comprise applying one or more layers of a sealing compound 106, 108, 206 to the back surface of the face panel 102, 202, 302, 402 such that the sealing compound 106, 108, 206 covers the graphic 104, 204, 304, 404. In one or more implementations, act 504 comprises printing at least one opaque white layer 106, 108, 206 over the graphic 104, 204, 304, 404. The one or more layers of a sealing compound can help prevent the colors or designs in the graphic 104, 204, 304, 404 from bleeding or otherwise blurring.

As with the graphic 104, 204, 304, 404, the sealing compound 106, 108, 206 may not cover the entire back surface of the face panel 102, 202, 302, 402. For example, if a face panel 102, 202, 302, 402 includes a window portion 216, 306, 308, 406, 408, 410 that is substantially free from any graphic, this window portion 216, 306, 308, 406, 408, 410 may also be substantially free from any sealing compound 106, 108, 206. One will appreciate in light of the disclosure herein, when the sealing compound is opaque or when the graphic is opaque, it may not be possible to see the back panel 110, 210 through the face panel 102, 202, 302, 402, except through window portions 216, 306, 308, 406, 408, 410.

The method can further involve applying a protective mask to one or more sides of the face panel and/or back panel in order to avoid scuffing or otherwise damaging the face panel, back panel, graphic, or sealing compound layer(s) while transporting or laminating the panels and/or during the other steps of the manufacturing process. The protective mask can comprise a thin plastic or other material that covers the face panel and/or back panel in whole or in part.

FIG. 7 further illustrates that method 500 can comprise a step 506 of securing the face panel to the rear panel. Act 506 can comprise securing the back surface of the face panel 102, 202, 302, 402 to a front surface of a back panel 110, 210 such that the graphic 104, 204, 304, 404 and sealing compound 106, 108, 206 are positioned between the face panel 102, 202, 302, 402 and the back panel 110, 210. In particular, the graphic 104, 204, 304, 404 is visible through the face panel 102, 202, 302, 402. For example, act 506 can include apply an adhesive layer, such as a pressure sensitive adhesive, over the front surface of the back panel 110, 210. Act 506 can then involve abutting the adhesive on the front surface of the back panel 110, 210 against the sealing compound on the back surface of the face panel. Act 506 can involve activating the adhesive by applying pressure and/or heat to the assembly.

In at least one implementation, prior to securing face panel 102, 202, 302, 402 to back panel 110, 210, the method 500 can further include milling out at least one recessed section in the front surface of the back panel. In particular, the method 500 can involve forming a recessed section 212, 310, 312, 412, 414, 416 extending into the front surface of the back panel and toward a back surface of the back panel. To the extent that the recessed section 212, 310, 312, 412, 414, 416 is milled or otherwise cut out of the front surface of the back panel, this recessed section 212, 310, 312, 412, 414, 416 may correspond substantially in size and shape to the window of space in the face panel.

Furthermore, forming the recessed section 212, 310, 312, 412, 414, 416 can also remove any adhesive applied to the region being milled. To the extent that the recessed section 212, 310, 312, 412, 414, 416 is milled or otherwise cut out of the back surface of the face panel, the milling or cutting process can remove any graphic and/or sealing compound to form a recessed, window area. Regardless of whether the recessed section 212, 310, 312, 412, 414, 416 is created in the face panel or the back panel, the recessed section 212, 310, 312, 412, 414, 416 may extend to at least one edge of the face and/or back panel.

Once the back panel is secured to the front panel, the recessed section 212, 310, 312, 412, 414, 416 may create a gap or slot between the face panel and the back panel. One or more inserts may be selectively inserted into and/or removed from the slot or gap created by the recessed section between the face panel and the back panel. The one or more inserts 214, 314, 316, 418, 420, 422 may be selectively inserted into and/or removed from the wall plaque through one or more sides of the wall plaque.

During the manufacturing process, more than one graphic may be printed to the back surface of a single large transparent or semi-transparent sheet. For example, the same graphic or different graphics may be printed to the back surface of this large sheet. One or more layers of the sealing compound may also be applied to the back surface of the large transparent or semitransparent sheet. This sheet can be placed on a cutting table where a cutting machine or tool may cut each individual face panel out.

The present invention may be embodied in other specific forms without departing from its spirit or essential characteristics. For example, in one or more implementations, the front surface of a back panel may have a graphic printed thereon. In such an implementation, an adhesion promoter may be applied to the front surface of a back panel prior to the printing of a graphic. In addition, one or more sealing compounds may be applied to the front of the graphic. Obviously, in order for the graphic to be viewable through a face panel, any sealing compound applied to the front of the graphic would need to be transparent or semi-transparent. The described implementations are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:
1. A wall plaque comprising:
a transparent or semi-transparent face panel having a front surface and a back surface;
a back panel having a front surface and a back surface;

a graphic positioned between the face panel and the back panel, the graphic being printed on the back surface of the face panel or the front surface of the back panel;

at least one layer of sealing compound covering the graphic such that the graphic is positioned between the sealing compound and the surface on which the graphic is printed, the at least one layer of sealing compound sealing the graphic on the surface on which the graphic is printed and substantially preventing the graphic from bleeding or blurring on the surface on which the graphic is printed;

an attachment mechanism securing the face panel to the back panel such that the graphic and sealing compound are positioned between the face panel and the back panel;

a window portion on the back surface of the face panel that is substantially free from any graphic; and a recessed section extending into the front surface of the back panel or the back surface of the face panel, the recessed section defining a gap between the face panel and the back panel;

wherein the recessed section is aligned with the window portion.

2. The wall plaque as recited in claim 1, wherein the sealing compound comprises opaque white ink.

3. The wall plaque as recited in claim 2, wherein two layers of the sealing compound cover the graphic.

4. The wall plaque as recited in claim 1, wherein the attachment mechanism permanently secures the face panel to the back panel.

5. The wall plaque as recited in claim 4, wherein the attachment mechanism comprises a pressure activated adhesive positioned between the front surface of the back panel and the sealing compound.

6. The wall plaque as recited in claim 1, further comprising a spacing member secured to the back surface of the back panel.

7. The wall plaque as recited in claim 1, wherein the recessed section extends to at least one side edge of the wall plaque.

8. The wall plaque as recited in claim 7, further comprising at least one insert sized and configured to be selectively inserted into and removed from the gap defined by the recessed section.

9. A wall plaque comprising:

a transparent or semi-transparent face panel having a front surface and a back surface;

a back panel having a front surface and a back surface, the front surface of the back panel being laminated to the back surface of the face panel;

a graphic positioned between the face panel and the back panel, the graphic being printed on a portion of the back surface of the face panel or on a portion of the front surface of the back panel;

a window portion on the back surface of the face panel that is substantially free of any graphic; and at least one recessed section extending into the front surface of the back panel or the back surface of the face panel, the at least one recessed section defining a gap between the face panel and the back panel, and the at least one recessed section being aligned with the window portion of the face panel.

10. The wall plaque as recited in claim 9, further comprising at least one insert sized and configured to be selectively inserted into and removed from the gap between the face panel and the back panel.

11. The wall plaque as recited in claim 10, wherein the at least one recessed section and the at least one insert each have a surface area larger than the surface area of the window portion such that when inserted into the gap, one or more edges of the at least one insert are positioned behind the graphic.

12. The wall plaque as recited in claim 9, further comprising a sealing compound covering the graphic, the graphic being positioned between the sealing compound and the surface on which the graphic is printed.

13. The wall plaque as recited in claim 12, wherein the sealing compound comprises one or more layer of opaque white ink.

14. The wall plaque as recited in claim 13, further comprising an adhesive positioned between the front surface of the back panel and the back surface of the face panel, the adhesive securing the back panel to the face panel.

15. A method for manufacturing a wall plaque comprising:

printing a graphic directly on at least a portion of either a back surface of a transparent or translucent face panel or a front surface of a back panel;

applying one or more layers of a sealing compound over the graphic so the graphic is positioned between the sealing compound and the surface on which the graphic is printed; and securing the face panel to the back panel such that the graphic and sealing compound are positioned between the face panel and the back panel and the graphic is visible through the face panel.

16. The method as recited in claim 15, further comprising forming a window portion on the back surface of the face panel.

17. The method as recited in claim 16, further comprising:

milling out at least one recessed section in at least one of the front surface of the back panel or the back surface of the face panel, the at least one recessed section extending into at least one of:

the front surface of the back panel and toward a back surface of the back panel; or the back surface of the face panel and toward a front surface of the face panel; and wherein the window portion is aligned over the recessed section.

18. The method as recited in claim 15, further comprising:

applying a pressure activated adhesive between the face panel and the back panel;

wherein application of pressure to the wall plaque activates the pressure activated adhesive to thereby secure the face panel to the back panel.

19. The method as recited in claim 18, wherein the pressure activated adhesive comprises a film layer.

20. The method as recited in claim 18, wherein the pressure activated adhesive is applied over the sealing compound and graphic.

21. The method as recited in claim 15, wherein applying one or more layers of a sealing compound over the graphic comprises printing at least one opaque white layer over the graphic.

22. The method as recited in claim 15, wherein printing a graphic comprises printing a UV curable ink onto an acrylic or resin face panel.

* * * * *